United States Patent Office 3,304,183
Patented Feb. 14, 1967

3,304,183
ASCORBIC ACID AND AN OXIDIZING AGENT IN CONTINUOUS BREAD PROCESS
William R. Johnston, Wayzata, and Robert E. Mauseth, Minneapolis, Minn., assignors to International Milling Company Inc., Minneapolis, Minn., a corporation of New York
No Drawing. Filed Aug. 18, 1965, Ser. No. 480,797
10 Claims. (Cl. 99—90)

This application is a continuation-in-part application of our application, U.S. Serial No. 402,346, filed October 7, 1964, and now abandoned.

The present invention relates to the use of the ascorbic acid isomers (l-ascorbic acid and d-araboascorbic acid) to reduce the mixing speed requirements of a dough in the production of bread, buns, and similar yeast leavened bakery products by the continuous dough process. In this disclosure the generic term ascorbic acid will be used to cover both isomers when specific identification of a given isomer is not necessary to properly disclose the invention since we have found the two isomers to be substantially equivalent in reducing dough mixing requirements in the continuous dough process.

The continuous dough process employing machinery manufactured by Wallace & Tiernan, Inc. and American Machine and Foundry Company is being widely used in the U.S.A. for the production of white pan bread, a general description of such processes being found in Chapter 17 of Bakery Technology and Engineering (1960), edited by Samuel A. Matz. It has been estimated 25% to 30% of the white pan bread made in 1964, and that over 30% of the white pan bread will be made in 1965 by the continuous dough process. The chief attraction of this process is the lower operating cost compared to other conventional processes. The savings are achieved by rapid dough development so that over 7,000 loaves per hour can be produced with a standard compact machine.

The flour used in the continuous dough process must be capable of forming a dough very rapidly with a minimal mixing speed requirement. Millers are constantly experimenting with blends of spring, winter, and soft wheat flours to produce a satisfactory dough; but many doughs require such a high mixing speed that optimum production rates cannot be maintained, and the baker's cost of production consequently increases. Various expedients have been tried to reduce the mixing speed requirement of flours with only partial success. One approach is to maintain a high level of acidity in the fermented broth which is used to leaven the dough. For example lactic acid, acetic acid and monocalcium phosphates are frequently added to the fermented broth to reduce the mixing speed requirement of a given flour. However, even at relatively high levels such acids conventionally used are not very effective in reducing the required mixing speed, and at high levels such acids have a deleterious effect on the bread quality. Frequently the broth is fermented for several hours to produce a high level of fermentation acids such as lactic, acetic, malic, and tartaric. Cysteine is also used to reduce dough mixing requirements.

We found that l-ascorbic acid (vitamin C) or d-araboascorbic acid exert a wholly unexpected effect on the mixing speed requirement of a wide variety of flours. Even at the very low level of 10 p.p.m. (based on the flour), these ascorbic acid isomers reduce the mixing speed requirement of a given flour by about 10%. The unexpected nature of this effect is emphasized by the fact that when lactic acid or other fermentation acids are used at over three times this level, they have no significant effect on the mixing speed requirement of a given flour.

Accordingly, we have discovered that the use of ascorbic acid in amounts ranging from 10 to 200 p.p.m. or more results in a marked reduction in the mixing speed requirements of continuous process doughs. The use of l-ascorbic acid as a flour and bread improver has been known for many years. Jorgenson obtained U.S. Patent 2,149,687 on March 7, 1939, covering the use of l-ascorbic acid in amounts up to 50 p.p.m. as a flour and bread improver in conventional (non-continuous) dough processes. His work, as well as that of others, revealed the improving effect of l-ascorbic acid as similar to that of potassium bromate in increasing loaf volume and in improving the internal characteristics of the loaf by producing a finer grain than loaves made from an untreated control flour. It is generally agreed today that this improving effect of l-ascorbic acid is oxidative in effect through dehydroascorbic acid which is produced in doughs from ascorbic acid by enzymic oxidation. On the other hand d-araboascorbic acid does not show an improving effect in conventional (non-continuous) dough processes, presumably since it is not oxidized to dehydroascorbic acid in the dough by enzymic action. This was shown by Feaster and Cathcart, Cereal Chemistry, volume 18, page 201, March 1941.

In our studies of the effect of ascorbic acid upon the dough and the bread produced by the continuous dough process, we found effects markedly different from the effect produced by potassium bromate. We discovered that in using levels of ascorbic acid of 10 to 200 p.p.m. that a very significant decrease in mixing speed requirements for continuous dough processes was effected without lowering the score of the produced bread below normally commercially acceptable levels; and that at higher levels the mixing speed requirements for such processes are reduced even though for some flours the bread score falls below normally commercially accepted levels. This effect is not due to oxidation of dough constituents by ascorbic acid since it is not produced by known oxidizing agents such as potassium bromate and potassium iodate. The effect appears to be due to the ability of ascorbic acid to act as a reducing agent under certain conditions. However, when ascorbic acid is used as a replacement for potassium bromate or potassium iodate in continuous dough processes, bread having inferior internal characteristics is produced. It is only when ascorbic acid is used in combination with known edible oxidizing agents such as potassium bromate and potassium iodate that its effect of reducing the mixing speed requirement of dough can be realized while producing bread of acceptable quality. This is the novel and unexpected feature of the phenomena we have discovered.

A specific object of this invention is to provide a variety of flours for continuous dough applications which contain added ascorbic acid at a level of 10 to 200 p.p.m. to provide flours with minimal mixing speed requirements.

It is a further object of this invention to provide for reducing the mixing speed requirement of a given flour through the addition of ascorbic acid to the flour, to the fermentation broth or oxidant solution used in the continuous dough process at about 10 p.p.m. and above.

Other and further objects are those inherent in the invention herein illustrated, described and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The use of ascorbic acid in the production of bread by a continuous dough process will be exemplified by its application in the presently most widely used continuous dough processes, i.e. the process of Wallace & Tiernan Inc. known under the trademark "Do-Maker" process, which comprises the following steps:

(1) Preparation of a fermentation brew or broth which has a variable composition but usually contains yeast, yeast food, fermentable sugar, buffer salts, and milk solids in water suspension. The brew may also contain flour, mold-inhibiting salt, enrichment ingredients, enzyme supplements, etc. The brew is usually fermented 2½ hours at 85° to 90°.

(2) The admixture of the brew with flour, shortening, and an oxidizing solution to form a viscous "batter" in a so-called pre-mixing step. The shortening must meet critical specifications which typically are:

| | Percent |
|---|---|
| Lard—melting point 102° F. | 87 |
| Emulsifier | 8 |
| Cottonseed flakes—melting point 140° F. | 5 |

The oxidizing solution is usually composed of potassium bromate and potassium iodate in the ratio of between 5:1 and 8:1 and has a concentration of 0.25% to 0.50%. A potassium bromate-potassium iodate solution having a solute of about 40 p.p.m. to 80 p.p.m. potassium bromate and 5 p.p.m. to 20 p.p.m. potassium iodate on a flour basis may be used.

(3) The thick batter produced in Step 2 is pumped into the developer unit wherein it is mixed at high speed to form a dough. The dough in the developer unit is in an oxygen free system, i.e. is not exposed to atmospheric oxygen as it is mixed. The dough is deposited directly from the developer into pans, proofed for about 60 minutes, and then baked in a standard oven.

Our invention provides a method whereby the baker can operate the developer at a significantly lower speed and yet produce the same quality of developed dough and finished bread as obtained at higher mixing speeds without the use of ascorbic acids. This is of great importance because the lower the mixing speed requirement, the greater the production rate in a given machine. A mixing speed reduction of 10% is sufficient to permit a production rate increase of about 20%.

The mixing speed requirement is dependent for a given dough composition on the design of the developer. The mixing speed reduction effected by ascorbic acid was measured with a small commercial continuous dough machine (Model 36 Do-Maker, sold by Wallace & Tiernan Inc.). The larger commercial machine (Model 60 Do-Maker) may require higher mixing speeds for a given dough, but the relative decrease in mixing speed effected by ascorbic acid would be comparable to that obtained with the Model 36 machine.

The amount of ascorbic acid used (based on flour weight) to reduce the mixing speed requirement in a continuous dough process may vary from 10 to 200 p.p.m. or more depending upon the composition of the oxidizing solution, the extent of fermentation time, the composition of the brew, and the type of flour. The selection of the level of ascorbic acid to be used is dependent on the particular flour, allowable cost, desired mixing speed and acceptable bread quality. The upper level of ascorbic acid usage on the basis of the flours tested and a normally commercially acceptable bread score is about 400 p.p.m. The ascorbic acid may be added to the flour, to the brew, or to the oxidizing solution. It is desired that 10–120 p.p.m. of ascorbic acid are used and preferably 20–80 p.p.m.

In comparing the data given in the various examples, certain standard statistical techniques have been used.

Standard deviations for the tests were estimated using the formula:

$$S^2 = \frac{\sum_{i=1}^{i=n}(Xi - \overline{X})^2}{n-1}$$

where S is the estimated standard deviation, n is the sample number; $Xi$ is an individual observation and $\overline{X}$ is the average of all of the observations.

Least significant difference (LSD) values for the 95% confidence level were calculated using the formula:

$$\text{LSD} = \frac{S \times 2\sqrt{2}}{n}$$

where S is the estimate of standard deviation and n is the number of replications performed to give the results that are being compared. In all the samples listed, n is taken to be one.

Table I lists the estimates of standard deviations and the least significant differences for the various tests used.

TABLE I

| Test | Standard Deviation | LSD |
|---|---|---|
| Mixing Speed (r.p.m.) | 8 | 23 |
| Specific Volume (cc./gm.) | .11 | .31 |
| Total Score | 3 | 8 |

*Example 1*

Using a typical formula and procedure with spring wheat flour and with a standard production model of a continuous dough machine, i.e. Wallace & Tiernan Do-Maker 36, bread was made with and without ascorbic acid. The formula used is as follows:

TABLE II.—TYPICAL CONTINUOUS DOUGH FORMULA

| Ingredient: | Percent of flour (weight basis) |
|---|---|
| Flour | 100 |
| Water | [1] 66 |
| Sugar | 8.0 |
| Yeast | 3.00 |
| Shortening | 3.25 |
| Salt | 2.1 |
| Milk (dry) | [1] 1.0 |
| Yeast food | .626 |
| Mono calcium phosphate | .145 |
| Sodium propionate | .10 |
| Oxidizing agents (potassium bromate and potassium iodate) | .009 |

[1] Variable.

The procedure specified that all ingredients except flour, shortening, and edible oxidizing agents be placed in a large tank and allowed to ferment for 2½ hours. This broth and the remaining ingredients are then metered into the premixer and then pumped after premixing into the developer of the Do-Maker machine. The dough is then extruded into tared pans and then weighed, proofed, and baked.

One hour after baking, the volume of each loaf is measured by seed displacement. The loaves are judged on the morning of the following day. Both external and internal characteristics are observed and rated according to a typical scoring procedure. The total score (maximum of 100) is the sum of scores for internal and external characteristics. Specific volume is calculated by dividing bread volume in cubic centimeters by dough weight in grams.

The baking results observed when ascorbic acid was added in increments to the oxidizing solution are listed in the following table.

TABLE III.—THE EFFECT OF l-ASCORBIC ACID UPON DOUGH AND BREAD

| l-Ascorbic Acid (p.p.m.) | 0 | 40 | 60 | 80 | 100 | 120 |
|---|---|---|---|---|---|---|
| Optimum Mixing Speed (r.p.m.) | 190 | 160 | 150 | 150 | 140 | 140 |
| Specific Volume (cc./gm.) | 5.00 | 5.19 | 5.06 | 4.97 | 5.12 | 5.22 |
| Total Bread Score* | 70 | 66 | 66 | 63 | 68 | 67 |

*Commercial breads (using the same scoring procedure) have a total score in the range of 60 to 80.

As the l-ascorbic acid level was increased, the mixing speed requirement was decreased, specific volume was increased and total score was not changed significantly.

*Example 2*

Using a blend of a spring wheat flour and a winter wheat flour, and the same formula and procedure as in Example 1, bread was made with and without l-ascorbic acid. The baking results are listed in the following table.

TABLE IV.—THE EFFECT OF l-ASCORBIC ACID UPON DOUGH AND BREAD

| l-Ascorbic Acid (p.p.m.) | Optimum Mixing Speed (r.p.m.) | Specific Vol., cc./gm. | Total Bread Score |
|---|---|---|---|
| 0 | 260 | 4.58 | 80 |
| 10 | 230 | 4.52 | 81 |
| 20 | 230 | 4.54 | 73 |
| 40 | 210 | 4.56 | 73 |
| 50 | 200 | 4.56 | 72 |
| 100 | 200 | 4.63 | 69 |
| 200 | 190 | 4.93 | 66 |
| 400 | 190 | 4.69 | 62 |
| 600 | 190 | 4.61 | 53 |
| 800 | 200 | 4.77 | 59 |
| 1,000 | 200 | 4.81 | 50 |

As shown in Table IV, the first increments of l-ascorbic acid addition have the greatest effect upon the mixing speed requirements of a flour so that a level of approximately 50 p.p.m. is optimum for this flour blend if a bread score greater than 70 is considered necessary by the baker. As shown, levels of 10 p.p.m. to 1000 p.p.m. are beneficial in reducing mixing speed requirements, although there is a significant decrease in bread quality at the higher levels and the l-ascorbic acid effect on mixing speed in these runs is at a maximum at 200 p.p.m. However, for these runs 400 p.p.m. gave the same optimum mixing speed as 200 p.p.m. without reducing the bread score below a normally commercially acceptable level.

The selection of the level of l-ascorbic acid to be used will depend on: (1) cost of added ascorbic acid at about $1.80 per pound, (2) desired mixing speed, and (3) desired bread score. On the average a level not exceeding 120 p.p.m. based on flour will be optimal from an overall commercial production standpoint. However, as may be noted from the above table, l-ascoribic acid may be used over a wide range of levels (depending on flour characteristics, bread formula, and production conditions).

*Example 3*

Using a blend of a spring wheat and a winter wheat flour, and the same formula and procedure used in Example 1, bread was made with and without the addition of d-araboascorbic acid, an isomeric form of l-ascorbic acid. The results are listed in the Table V.

TABLE V.—THE EFFECT OF d-ARABOASCORBIC ACID UPON DOUGH AND BREAD

| d-Araboascorbic Acid (p.p.m.) | Optimum Mixing Speed (r.p.m.) | Specific Vol., cc./gm. | Total Bread Score |
|---|---|---|---|
| 0 | 225 | 4.79 | 74 |
| 20 | 200 | 4.77 | 76 |
| 40 | 190 | 4.66 | 71 |
| 80 | 190 | 4.82 | 63 |
| 100 | 180 | 4.83 | 69 |
| 200 | 190 | 4.89 | 62 |
| 400 | 180 | 4.80 | 71 |

As with l-ascorbic acid, the first increments of d-araboascorbic acid added has the greatest effect upon mixing speed requirements, but all levels through 400 p.p.m. were beneficial in reducing the mixing speed requirement of the dough.

*Example 4*

Using a different spring wheat flour blend than used in Example 1, four runs were made wherein l-ascorbic acid was added (1) to the oxidizing solution, (2) to the brew or broth, and (3) to the flour, and then its effect was judged, while no ascorbic acid was added (4) to the control. The formula and procedure described in Example 1 were used, with the variation for runs (1), (2), and (3) where l-ascorbic acid was added to the dough component indicated below. The results are listed in the following table:

TABLE VI.—EFFECT OF l-ASCORBIC ACID IN RELATION TO PROCESS INGREDIENTS

| Manner of Addition of l-Ascorbic Acid (80 p.p.m.) | (1) Oxidation Solution | (2) Brew | (3) Flour | (4) Control (None) |
|---|---|---|---|---|
| Optimum (r.p.m.) | 150 | 150 | 160 | 190 |
| Specific Volume (cc./gm.) | 5.07 | 5.03 | 5.09 | 4.84 |
| Total Score of Bread | 65 | 69 | 65 | 65 |

The same effect was noted regardless of the manner of addition of l-ascorbic acid. A considerable decrease in mixing speed requirements was noted when l-ascorbic acid was added as compared to when none was added.

*Example 5*

Using a different spring wheat flour blend than used in Example 4, the same formula and procedure was followed except that 35% of the flour was added to the brew at the beginning of fermentation. Where l-ascorbic acid was used, it was added to the oxidizing solution.

The baking results are listed in Table VII.

TABLE VII.—EFFECT OF l-ASCORBIC ACID WITH FLOUR IN THE BREW

| l-Ascorbic Acid (p.p.m.) | 0 | 80 |
|---|---|---|
| Optimum Mixing Speed (r.p.m.) | 170 | 140 |
| Specific Volume (cc./gm.) | 5.01 | 5.18 |
| Total Bread Score | 72 | 70 |

Again the addition of l-ascorbic acid decreased the mixing requirements.

Example 6

Using a different spring wheat flour blend than in previous examples, l-ascorbic acid was added to a system that contained but 50% of the normal amount of potassium bromate and to a system that contained no potassium bromate. The formula and procedure described in Example 1 were used other than for varying the amounts of potassium bromate from 80 to 0 p.p.m. as indicated in Table V and the l-ascorbic acid was added to the oxidizing solution in the amounts indicated in said table. The results are listed in the following table:

TABLE VIII.—EFFECT OF l-ASCORBIC ACID WITH VARIOUS LEVELS OF POTASSIUM BROMATE

| | | | | |
|---|---|---|---|---|
| Potassium Bromate (p.p.m.) | 80 | 80 | 40 | 0 |
| l-Ascorbic Acid (p.p.m.) | 0 | 80 | 80 | 160 |
| Optimum Mixing Speed (r.p.m.) | 180 | 120 | 125 | 110 |
| Specific Volume (cc./gm.) | 4.92 | 5.00 | 4.98 | 4.97 |
| Total Bread Score | 69 | 62 | 52 | 35 |

As the level of potassium bromate is decreased, the total bread score decreases rapidly. The l-ascorbic acid still effects a reduction in mixing speed, but the bread is of unacceptable quality without the potassium bromate as indicated by bread scores 52 and 35 respectively.

For a continuous dough process an oxidizing solution having about 60 to 80 p.p.m. of the oxidizing agent solute is used which is in addition to the amount of ascorbic acid used as per this invention to reduce the mixing speed requirements.

Example 7

Using a different spring wheat flour blend than was used in the previous examples, the same basic formula and procedure was used except that each of several oxidizing agents was substituted for the potassium bromate. The agents used were (1) ammonium persulfate; (2) Maturox, a proprietary name for a maturing agent containing azodicarbonamide; and (3) Keetox, a proprietary name for a maturing agent containing acetone peroxide.

The baking results are listed in Table IX. Ten parts per million (p.p.m.) of potassium iodate were used with all of the oxidants. The amounts listed for each agent are the amounts of active ingredient present, based on flour.

TABLE IX.—EFFECT OF VARIOUS OXIDANTS PLUS l-ASCORBIC ACID

| Oxidant | Oxidant Level (p.p.m.)* | Ascorbic Acid (p.p.m.) | Optimum r.p.m. | Specific Volume, cc./gm. | Total Score |
|---|---|---|---|---|---|
| Potassium bromate | 80 | 0 | 190 | 5.00 | 70 |
| Do | 80 | 60 | 150 | 5.06 | 66 |
| Ammonium persulfate | 80 | 0 | 190 | 5.11 | 54 |
| Do | 80 | 80 | 140 | 5.13 | 62 |
| Maturox | 80 | 0 | 210 | 5.26 | 49 |
| Do | 80 | 80 | 170 | 5.31 | 59 |
| Keetox | 60 | 0 | 210 | 4.87 | 70 |
| Do | 60 | 80 | 160 | 5.03 | 44 |

*P.p.m.=Parts per million.

In all instances the use of l-ascorbic acid resulted in a lower mixing speed requirement. Since the use of the various oxidants resulted in higher mixing speed requirements or poorer bread than when potassium bromate was used, potassium bromate is the oxidant preferred to be used in conjunction with ascorbic acid.

Example 8

The effect of reducing agents such as cysteine hydrochloride and sodium bisulfite upon the mixing time needed to properly develop a dough in conventional bread processes has been reported in the cereal literature. It is well known that a reduction in mixing time is effected by these substances. A comparison of cysteine hydrochloride and l-ascorbic acid when used in the continuous process is the subject of the present example.

Cysteine hydrochloride and l-ascorbic acid (amounts based on flour) were added to separate portions of a spring wheat flour blend using the procedure and formula described in Example 1. The baking results are listed in the following table.

TABLE X.—EFFECT OF CYSTEINE HYDROCHLORIDE AND l-ASCORBIC ACID

| | | | |
|---|---|---|---|
| Cysteine Hydrochloride (p.p.m.) | 0 | 80 | 0 |
| l-Ascorbic Acid (p.p.m.) | 0 | 0 | 80 |
| Optimum r.p.m. | 180 | 120 | 140 |
| Specific Volume (cc./gm.) | 5.05 | 5.23 | 5.28 |
| Total Bread Score | 69 | 49 | 67 |

Both additives reduced the mixing time requirements by a significant amount. When cysteine hydrochloride was used, the total bread score was reduced by a considerable amount (20 points) to an unacceptable level because of the poor internal structure of the bread. The grain was very open, having large holes and thick cell walls. The l-ascorbic acid produced no significant change in bread quality, and the bread made from flour containing it was judged to be equal to that made from the same flour containing no additives such as ascorbic acid and cysteine hydrochloride.

This example demonstrates that the effect of ascorbic acid differs from the effect of well known reducing agents and that the ascorbic acid effect is novel and unexpected. It has the advantage of other reducing agents in that it reduces mixing speed requirements without sharing their disadvantage of reducing bread quality to an unacceptable level.

As many widely apparently different embodiments of this invention may be made without departing from the spirit and scope thereof, it is to be understood that we do not limit ourselves to the specific embodiments herein.

What we claim is:

1. In a process for making bakery goods comprising admixing dough ingredients including a yeast fermentation brew, flour and shortening to a viscous batter, transferring the batter to an enclosed continuous developer stage, mixing the batter at a high speed in the developer stage to form a dough, depositing the dough in pans, and baking the deposited dough to form the bakery goods, the improvement comprising the steps of adding an effective amount of ascorbic acid to at least one of the dough ingredients prior to transferring the batter to the developer for substantially reducing the mixing speed requirements in the developer stage needed to develop the dough from that required without the ascorbic acid and adding at least a conventional amount of an edible oxidizing agent to at least one of the dough ingredients prior to transferring the batter to the developer for rendering the final bakery goods of a satisfactory quality, the amount of ascorbic acid being at least 10 p.p.m. on a flour basis.

2. A process for lowering the mixing speed requirements in making bakery goods by a continuous dough process out of a dough formulation containing a yeast fermentation brew, flour, shortening, water and at least a conventional amount of an oxidizing agent selected from the groups consisting of potassium bromate, potassium iodate, ammonium persulfate, and mixtures of potassium bromate and potassium iodate, comprising adding about 10 p.p.m. to 400 p.p.m. ascorbic acid on a flour basis to one of the dough components selected from the group consisting of yeast fermentation brew, flour, oxidizing agent, water and shortening prior to developing the dough, transferring the dough formulation to a continuous dough developer and then developing the dough having ascorbic acid therein in the continuous dough developer at a high speed whereby the mixing speed requirement of the dough is reduced from that if no ascorbic acid were incorporated.

3. The process of claim 2 further characterized in that the oxidizing agent is in a solution composed of potassium bromate and potassium iodate in a ratio of about between 5 to 1 and 8 to 1 and of a concentration of about 0.25% to 0.50%.

4. The process of claim 2 further characterized in that the ascorbic acid is incorporated in an amount between about 20 p.p.m. to 80 p.p.m.

5. The process of claim 4 further characterized in that the oxidizing agent comprises potassium bromate.

6. A process for lowering the mixing speed requirements of a dough in making bakery goods by a continuous dough process out of a dough formulation containing a fermentation brew, flour, shortening and an edible oxidizing solution, said oxidizing solution including a conventional amount of a primary oxidizing agent for providing satisfactory quality final bakery goods, said agent being selected from the group consisting of potassium bromate and ammonium persulfate, comprising adding 40 p.p.m. to 120 p.p.m. ascorbic acid on a flour basis to one of the dough components selected from the group consisting of a fermentation brew, flour and oxidizing solution for reducing the mixing speed requirements of the dough.

7. In a continuous dough process for making a dough for bakery goods, the steps of admixing a yeast fermentation brew, wheat flour, water, shortening and an edible oxidizing agent to a viscous batter, said oxidizing agent including a primary ingredient selected from the group consisting of potassium bromate in an amount between about 60 p.p.m. to 80 p.p.m. on a flour basis and ammonium persulfate in an amount of about 80 p.p.m. on a flour basis, transferring the batter to a continuous dough developer stage and admixing the batter at a high speed in the developer stage to form a dough, the improvement comprising incorporating about 10 p.p.m. to 200 p.p.m. of ascorbic acid on a flour basis to at least one of the batter ingredients for substantially reducing the mixing speed requirements of the dough in the developer stage.

8. The process of producing a dough for bakery goods produced by continuous dough process comprising mixing flour, shortening, a potassium bromate-potassium iodate oxidizing solution for having a solute of about 40 p.p.m. to 80 p.p.m. potassium bromate and 5 p.p.m. to 20 p.p.m. potassium iodate on a flour basis, a fermentation brew, and about 10 p.p.m. to 400 p.p.m. ascorbic acid on a flour basis to substantially reduce the mixing speed requirements of the dough in the developer from that without ascorbic acid, the amount of ascorbic acid used being less than that which would reduce the quality of the final bakery goods below a satisfactory level.

9. The process of claim 7 further characterized in that between about 20 p.p.m. to 80 p.p.m. of ascorbic acid is used.

10 In a continuous dough process for making bakery goods, the steps of preparing a yeast fermentation brew, admixing said brew with a wheat flour, shortening and an edible oxidizing agent to a viscous batter, said oxidizing agent being composed of about 40 p.p.m. to 80 p.p.m. potassium bromate and 5 p.p.m. to 20 p.p.m. potassium iodate on a flour basis, transferring the batter to an enclosed continuous dough developer stage and mixing the batter in the developer stage to form a dough, the improvement comprising the step of incorporating 10 p.p.m. to 400 p.p.m. ascorbic acid with at least one of the batter ingredients prior to transferring the batter to the developer stage for reducing the mixing speed requirements of the dough.

References Cited by the Examiner

UNITED STATES PATENTS 2,953,460  9/1960  Baker _____ 99—90

FOREIGN PATENTS 735,184  8/1955  Great Britain.

OTHER REFERENCES

Axford et al., "Special Report—Continuous Breadmaking—The Chorleywood Process," Cereal Science Today, October 1963, pp. 265, 266, 268, 270.

Chamberlin et al., "The Chorleywood Bread Process," The Bakers Digest, pp. 52–53, October 1962.

Tsen, "Ascorbic Acid as a Flour Improver," The Bakers Digest," October 1964, pp. 44 to 47.

A. LOUIS MONACELL, *Primary Examiner.*

JOSEPH M. GOLIAN, *Examiner.*